United States Patent [19] [11] Patent Number: 4,879,353
Sanders et al. [45] Date of Patent: Nov. 7, 1989

[54] BROMINATION OF POLYSTYRENE USING BROMINE AS THE REACTION SOLVENT

[75] Inventors: David C. Sanders; John L. Sands; Joseph L. Stahl, all of West Lafayette

[73] Assignee: Great Lakes Chemical Corporation, West Lafayette, Ind.

[21] Appl. No.: 266,245

[22] Filed: Oct. 28, 1988

Related U.S. Application Data

[63] Continuation of Ser. No. 7,778, Jan. 28, 1987, abandoned.

[51] Int. Cl.$^4$ ................................................. C08F 8/22
[52] U.S. Cl. .................................. 525/357; 525/333.4
[58] Field of Search ........................................ 525/357

[56] References Cited

U.S. PATENT DOCUMENTS

| | | |
|---|---|---|
| 3,965,197 | 6/1976 | Stepniczka . |
| 4,028,486 | 6/1977 | Jalics .................................... 526/293 |
| 4,074,032 | 2/1978 | Naarmann et al. .................. 525/357 |
| 4,143,221 | 3/1979 | Naarmann et al. .................. 525/357 |
| 4,200,703 | 4/1980 | Diebel et al. ......................... 525/357 |
| 4,223,169 | 9/1980 | Barda .................................... 568/645 |
| 4,287,373 | 9/1981 | Garman et al. ...................... 568/639 |
| 4,352,909 | 10/1982 | Barda et al. ......................... 525/157 |
| 4,360,455 | 11/1982 | Linderschmidt et al. ........... 252/609 |
| 4,546,139 | 10/1985 | Bay et al. ............................. 524/367 |

FOREIGN PATENT DOCUMENTS

| | | |
|---|---|---|
| 1124947 | 8/1982 | Canada . |
| 2400455 | 1/1975 | Fed. Rep. of Germany . |
| 2800012 | 7/1979 | Fed. Rep. of Germany . |
| 2800013 | 7/1979 | Fed. Rep. of Germany . |
| 1411524 | 10/1975 | United Kingdom . |

Primary Examiner—Christopher Henderson
Attorney, Agent, or Firm—Kirkland & Ellis

[57] ABSTRACT

A process for the bromination of polystyrenic homo- and co-polymers using bromine as the reaction medium, bromine chloride as the bromination reagent and a Lewis acid catalyst substantially improves product quality and permits controlling the reaction to achieve a desired level of bromination.

6 Claims, No Drawings

BROMINATION OF POLYSTYRENE USING BROMINE AS THE REACTION SOLVENT

This is a continuation of co-pending application Ser. No. 007,778, filed on Jan. 28, 1987, now abandoned.

BACKGROUND OF THE INVENTION

1. Field of the Invention

This invention relates generally to a process for the bromination of polystyrenic homo- and co-polymers using bromine as the reaction medium and bromine chloride as the bromination reagent and in which the degree of bromination can be controlled by adjusting the molar ratio of the bromination reagent to polystyrene.

2. Description of the Prior Art

In the past, numerous processes have been employed for brominating polystyrene. None of these processes has been found to be entirely successful; all have been found to have disadvantages.

Previously known polystyrene bromination processes have utilized reaction media such as a chlorohydrocarbon. See, e.g., Naarman et al., U.S. Pat. Nos. 4,074,032; Naarman et al, 4,143,221; Barda et al., 4,352,909; Diebel et al., Fed. Rep. of Germany Pat. No. 2800012. None of these references disclosed the use of bromine as the reaction medium.

At the same time, bromination of polystyrene by the prior art process has frequently been achieved in the presence of a catalyst, for example, aluminum trichloride or ferric chloride, having activities ill-suited to controlled bromination reactions. In Diebel et al., U.S. Pat. No. 4,200,703, the use of aluminum trichloride and ferric chloride as suitable catalysts for brominating polystyrene is disclosed, but the process requires that the catalyst be moderated by the addition of a nucleophilic substance such as water to avoid crosslinking of the polymer. See, e.g., Barda, U.S. Pat. No. 4,223,169 (disclosing the use of antimony chloride catalyst and moderation of the catalyst by the addition of water); Diebel et al., U.S. Pat. No. 4,200,703. See also, Barda, U.S. Pat. No. 4,352,909 (disclosing antimony chloride catalyst in a chlorohydrocarbon reaction medium without a moderating agent); Jalics, U.S. Pat. No. 4,028,486 and Kainmuller et al., Canadian Pat. No. 1,124,947.

Bromination of polystyrene according to prior art methods requires, in many instances, either pre-treatment of the polystyrene by hydrogenation to eliminate olefinic double bonds (Naarman et al., U.S. Pat. No. 4,074,032) or cationic polymerization of styrene in situ using the same catalyst intended as the bromination catalyst (Naarman et al., U.S. Pat. Nos. 4,143,221; Lindenschmidt et al., 4,360,455).

In addition to the foregoing prior art brominations of polystyrene, numerous processes have been employed in the past for brominating other aromatic compounds, such as diphenyl ether, phenol, toluene, xylene and napthyl ethers in a bromine reaction medium. None of these processes has been taught to be effective in the bromination of polystyrene.

Stepniczka, U.S. Pat. No. 3,965,197 discloses a process for the complete bromination of non-fused ring aromatic compounds, such as benzene, toluene, xylene, phenol and diphenyl ether. The disclosed process uses liquid bromine as the reaction solvent as well as the bromination reagent. A catalyst such as aluminum, iron, or their corresponding halides is used to effect the bromination at a temperature of about 10° C. to ambient. Similar processes are disclosed in British Patent Specification No. 1,411,524 and in German Pat. No. 2,400,455.

Bay et al, U.S. Pat. No. 4,546,139, issued Oct. 8, 1985, is a composition patent which describes the applications of polybromodinaphthyl ethers. It teaches a process for the bromination of naphthyl ethers using liquid bromine as the reaction solvent and bromination reagent. The procedure uses a Lewis acid catalyst such as aluminum trichloride, with a reaction temperature of 15° C. in order to effect the bromination. The products which result contain approximately 75% bromine.

In Garman et al, U.S. Pat. No. 4,287,373 a process for the bromination of phenol and diphenyl ether is described using liquid bromine as the reaction medium. The process, which uses a Lewis acid catalyst such as aluminum or iron halides at elevated temperatures of at least 35° C. up to 55° C., affords an essentially pure prebrominated product.

The Stepniczka, Bay, and Garman processes are not effective in controlling the bromination level on aromatic rings of polystyrene, or poly-(p-methylstyrene) or certain other styrenic-based polymers. Moreover, the processes disclosed in those patents call for the complete bromination of the identified aromatic compounds. Controlling the reaction to achieve a desired partial level of bromination is not disclosed and is, indeed, not possible by those processes. In addition, because the bromination reagent, bromine, in the Stepniczka, Bay, and Garman processes is relatively weak, a corresponding strong catalyst, such as aluminum trichloride, must be employed. In the case of polystyrenes and other styrenic polymers such a catalyst increases the amount of coincident polymer degradation and may promote polymer crosslinking, resulting in a less desirable product with decreased thermal stability and increased processing difficulties.

Brominated polystyrenic polymers prepared by this invention can be used to impart flame retardancy to many normally flammable materials such as thermoplastics and thermoset resins.

Accordingly, it is the primary object of the present invention to provide a method for brominating polystyrene to produce a thermally stable, flame-retardant additive.

Another object is to provide a method for brominating polystyrene in which the degree of bromination is controlled by adjusting the molar ratio of the bromination reagent to polystyrene.

SUMMARY OF THE INVENTION

Applicants have discovered a process for the controlled bromination of styrenic polymers which can provide an average bromine substitution in the range of about 1 to 5 bromine atoms per aromatic unit. The advantages of applicants' process are achieved by reacting polystyrenics, homo- or co-polymers, with a brominating agent in the presence of liquid bromine as the sole reaction solvent and a Lewis acid halide as a catalyst. The brominated styrenic polymer is thereafter recovered from the reaction mixture.

In its preferred embodiment, this process is conducted under anhydrous conditions and uses antimony metal as the catalyst and bromine chloride as the bromination reagent. The preferred process consists of simultaneously adding solid polystyrene and chlorine to excess liquid bromine in the presence of the antimony metal catalyst. The preferred catalyst is supplied in an amount of from about 0.1 to about 10 mole percent antimony metal based on contained styrenic units, which reacts with bromine, thus generating an antimony bromide in situ. The chlorine reacts with bromine yielding bromine chloride, the preferred bromination reagent.

The bromine content of the resulting product can be controlled by adjusting the mole ratio of chlorine to polystyrene which typically lies in the range between about 0 to 4 moles chlorine/mole polystyrene.

The brominated polystyrene produced by this process has a peak molecular weight versus polystyrene ("MPS molecular weight") of from about 500 to about 500,000 and a bromine content of about 40 to about 76%. The product typically contains less than about 1% organic chlorine. The product may be isolated by flash distillation of the bromine from hot water affording an easily filtered aqueous product slurry. Brominated polystyrenes which result from this process are, among other things, useful as flame retardant additives in various polymers.

DESCRIPTION OF THE PREFERRED EMBODIMENTS

A preferred embodiment of the process is represented by the following chemical equation:

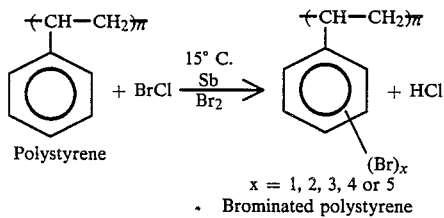

In accordance with the present invention, polystyrene is brominated by a controlled Lewis acid halide catalyzed halogenation reaction of the aromatic units using bromine chloride as the bromination reagent. This preferred process uses antimony metal as the catalyst, liquid bromine as the sole reaction medium, and a reaction temperature of from about $-20°$ C. to about $60°$ C., but preferably about $10°-30°$ C. A by-product of the process is gaseous hydrogen chloride.

The brominated polystyrene is isolated as an aqueous slurry by the slow addition of the brominated polystyrene in bromine solution to hot water, which removes the bromine by distillation and produces an aqueous product slurry. The product is recovered by filtration and may then be dried in an oven. The brominated product can have a molecular weight ranging from about 500 to about 500,000 depending upon the molecular weight of the starting polystyrene.

The polystyrenes used in this process are obtained by the ionic or free radical polymerization of styrene monomer. These polymerizations can be initiated by peroxide, azo compounds, Lewis acid catalysts or thermal means. The styrene monomer itself can be obtained from any of the commercial suppliers, and generally contains from about 15 up to about 70 ppm t-butylcatechol stabilizer. In addition, polystyrene available from commercial sources may also be used in the process.

It is preferred that the polystyrene to be brominated have an MPS molecular weight falling within the range of about 300 to about 1,500,000 as determined by gel permeation chromatography. Applicants have successfully demonstrated the use of the subject process with polystyrene having MPS molecular weights falling within the preferred range of about 300 to about 300,000. That range affords a brominated polystyrene product with an MPS falling within the range of about 500 to about 300,000. The apparently unchanged molecular weight of the brominated product is believed to be due to some scission of the polymer chain under the bromination conditions.

The polystyrene used should be reasonably pure. Styrene monomer impurities, for example, can react with bromine or bromine chloride forming alkyl halides and result in product contamination which may impart thermal instability and resulting product discoloration. Accordingly, the polystyrene should contain low quantities of residual styrene monomer. It is most desirable to have a residual styrene monomer level less than about 0.1% by weight. Likewise, polystyrene which contains a high percentage of dimers or trimers of styrene containing carbon-carbon double bonds are also undesirable at equivalently high levels. In addition to olefins, the polystyrene should contain low levels of organic oxygen-containing compounds and water, with preferably a combined level of no more than about 300 ppm. Because such oxygen-containing impurities deactivate the aromatic bromination catalyst they reduce the organic bromine content of the final product and slow the reaction.

The process of the present invention may also be used to brominate other styrenic homopolymers and copolymers. Other polymers which may be brominated by this process include but are not limited to poly-(p-methylstyrene), poly-($\alpha$-methylstyrene) and copolymers of polystyrene with maleic anhydride or acrylonitrile. Mixtures of these polymers, as well as mixtures of these polymers with other polymers, may be brominated by this method as well.

Preferably, brominated polymers prepared from polystyrenics, homo- and co-polymers, have an organic bromine content ranging from about 10 up to about 75% by weight. This process can be used to produce brominated polystyrenics of virtually any degree of aromatic bromination from about 0 up to about 80% organic bromine content by weight.

For this process, it is preferred that the polystyrene be handled as a solid and the solid polymer added to the bromine. The polystyrene can be used directly in its commercially available solid form, or ground prior to use. Although it is possible to use inverse addition to effect bromination (i.e. to add the bromine to the polystyrene), that hinders stirring of the reaction mass and prevents adequate temperature control in the early stages of the bromination.

In accordance with the claimed process, bromine chloride, the bromination reagent, is preferably prepared in situ by the subsurface addition of chlorine to the bromine, polystyrene, catalyst mixture. Alternatively, bromine chloride can be prepared directly by introducing chlorine and bromine simultaneously into the reaction mixture. Commercially available bromine chloride can be used in a similar fashion.

For the preferred process in which chlorine and polystyrene are simultaneously added to bromine and catalyst, it is preferable to use a small excess, preferably about 15% excess, of chlorine over the stoichiometric amount required for the desired bromination level. Alternately, chlorine can be introduced following polystyrene addition, which requires a lower excess of chlorine over the theoretical amount required to obtain the desired bromination level. In further alternative embodiments of applicants' process, all of the chlorine can be added to the bromine prior to the polystyrene addition, or commercially available bromine chloride may be used.

In addition, bromine alone is effective as the bromination reagent. However, this typically results in a product with a lower organic bromine content. To achieve the high bromination levels found using bromine chloride as the bromination reagent requires harsher reaction conditions and extended reaction times and yields a product of impaired thermal stability.

Commercially available bromine, containing less than about 300 ppm and preferably less than about 50 ppm water, is used for the reaction solvent and/or bromine chloride preparation. Commercially available chlorine having the same preferred water specification is also used. Water should be maintained below these levels because it will hydrolyze and thus moderate the catalyst. As a result, low water levels in the bromine, chlorine, and polymer are preferred in order to assure maximal catalyst strength.

A catalyst of the Lewis acid halide type is used to effect the bromination. Such catalysts may be commercially obtained and used directly, or they can be generated in situ by reaction of the corresponding metal with bromine. Typical catalysts used in accordance with the present invention are Sb, $SbCl_3$, $SbCl_5$, Fe, $FeCl_3$, Al, $AlCl_3$, $SbBr_3$, $SbBr_5$, $FeBr_3$ and $AlBr_3$, or other Lewis acid halides of comparable catalytic strength or, less desirably, $TiCl_4$, $SnCl_4$, Zn and $ZnBr_2$.

The preferred catalysts for the reaction are the antimony halides, such as $SbCl_3$, or the antimony bromides, especially when generated in situ by the addition of antimony metal to bromine. Due to their lower activity, antimony halide catalysts tend to minimize scission of the polymer chains.

It is desirable for these catalysts to be anhydrous since water moderates the catalyst strength and prevents the attainment of higher organic bromine levels. Catalyst levels of from about one-tenth to about ten mole percent based upon the contained styrenic units in the polymer are used to catalyze the reaction. However, economics mandate the use of catalyst levels at or near the lower end of that range. The catalyst level preferably ranges from about 1 to about 3 mole percent.

The reaction medium selected for the process is liquid bromine, which is capable of dissolving not only the polystyrene but also the brominated polystyrene. In addition, for reaction temperatures of about 5° C. or less, liquid bromine chloride can be used for the reaction solvent. However, control of the bromination level is somewhat more difficult under these conditions.

The bromine used for the process should be essentially anhydrous, preferably with about 50 ppm or less water. The effect of water in the bromine can be overcome by using additional amounts of the catalyst, which effectively dries the system. However, due to the cost of the preferred catalyst, antimony metal, that alternative is not economically feasible. Alternately, the bromine can be rendered anhydrous by drying with concentrated sulfuric acid. Typically, this produces bromine with a final water content of less than about 50 ppm, which is the preferred level for this process. Using normal catalyst levels of 1 to 3 mole percent antimony metal, water concentrations significantly greater than about 50 ppm moderate catalyst activity and result in reduced bromine content of the final product.

The process can be carried out over a wide range of reaction temperatures from approximately −20° C. up to about 60° C. Lower reaction temperatures, although attainable through the addition of a freezing point depressant, tend to result in decreased reaction rates, and thus require longer reaction times and/or higher catalyst levels to achieve the proper organic bromine content. Higher reaction temperatures result in increased reaction rates and require lower catalyst levels. However, higher reaction temperatures also increase the rate of bromination at the aliphatic hydrocarbon segment of the polymer chain. Product from such bromination is less desirable due to its lower thermal stability. Thus, the preferred temperature for the process is in the range of about 10° C. up to about 30° C. Carrying out the reaction at about the preferred temperature produces product of desirable color, the proper organic bromine content, and acceptable hydrolyzable halogen levels. In addition, it efficiently balances reasonable catalyst levels against reaction time.

After the simultaneous addition of polystyrene and chlorine in the preferred process has been completed, the reaction mass is agitated at the preferred reaction temperature of about 15° C. During this period, the evolution of gaseous hydrogen chloride is monitored until the theoretical amount of hydrogen chloride for the desired bromination level has evolved. Typically, this requires about one hour or less for an essentially anhydrous system.

Upon completion of the agitation period, the catalyst contained in the reaction mass (which contains primarily bromine and brominated polystyrene) may, if desired, be deactivated by the addition of a small amount of water. The water decomposes the active catalyst and stops further aromatic bromination. The amount of water used can vary from a stoichiometric amount for the contained catalyst to copious excesses.

The brominated polystyrene is recovered from the reaction mass by precipitation using a non-solvent such as water. The reaction mass is preferably added slowly to hot (e.g. $\geq 90°$ C.) water. The hot non-solvent removes the bromine by distillation and simultaneously isolates the brominated polystyrene as a water slurry. Organic non-solvents which are inert to bromine may also be used for product isolation. Water is the preferred non-solvent for the product isolation since it can easily be separated from bromine thus facilitating solvent bromine recovery and recycle.

The precipitated product is then preferably collected by filtration. Alternately, the aqueous polymer slurry can be treated with bromine reducing agents such as ammonia, hydrazine, sodium formate, formic acid, sulfur dioxide, sodium bisulfite, or sodium sulfite to assist in removing possible residual traces of free bromine prior to filtration. In addition, if a product of greater purity is desired, the precipitated wet filter cake can be dissolved in a hydrocarbon or chlorinated hydrocarbon solvent and precipitated a second time into a non-solvent.

EXAMPLE I

Bromination of Polystyrene (MW 9000) in Bromine Using Chlorine and Antimony Metal To a one liter round-bottom flask fitted with a mechanical stirrer, thermometer, and a dip tube for the introduction of chlorine gas, was charged 495 ml (1545.3 g, 9.67 moles) of liquid bromine and 5.3 g (0.044 mole) of antimony metal. The bromination mixture was cooled to 15° C. and 150 g (1.44 moles) of solid polystyrene was continuously added over one hour. Commencing with the polystyrene addition, 138.4 g (1.95 moles) of chlorine gas were simultaneously added subsurface through the dip tube over two hours. Throughout the polystyrene and chlorine additions, the temperature of the bromination mixture was maintained at 15° C., and hydrogen chloride off-gas was absorbed into a scrubber with the rate of absorption monitored by the change in scrubber weight. Upon completion of the chlorine addition, the stirring was continued for one hour, during which time the hydrogen chloride evolution ceased. A total of 133.9 g of hydrogen chloride saturated with bromine was collected in the scrubber. The reaction mass was cooled to 5° C.

Polymer Isolation Procedure Using Water

To a 5L round-bottom flask fitted with a simple distillation apparatus and a peristaltic pump for the addition of the bromination mixture, was charged 3002.2 g of water. The water was heated to 95° C. and 1681.7 g of the brominated polystyrene/bromine reaction was slowly added to the distillation pot at such a rate as to maintain the pot temperature at ≧90° C. Throughout the addition, bromine was continuously flashed overhead along with water, and the brominated polystyrene isolated as a slurry in water. The brominated polystyrene slurry was held at 100° C. for one hour during which time the pot was periodically purged with nitrogen to aid in the removal of the last traces of bromine. A total of 1852.6 g of bromine and water was collected in the receiver during the bromine distillation. The brominated polystyrene water slurry was filtered, washed with 645.2 g water, and yielded 641.5 g of wet filter cake and 2745.2 g of aqueous mother liquor. The wet cake had a moisture content of 28% which, when dried, yielded 464.5 g of product. The product was analyzed as containing 67.5% organic bromine with an MPS molecular weight of 10,100.

EXAMPLE II

Bromination of Polystyrene (MW 9000) Using a Solvent Workup to Remove Occluded Bromine In a fashion similar to Example I, brominated polystyrene was prepared using 3.5 mole percent antimony metal. The ratio of polystyrene to bromine was changed to 1:18.6. After removal of the bromine by flash distillation from water and filtration of the product, a portion of the wet filter cake was dissolved in 220 ml of 1,2-dichloroethane affording a 16.6 wt % solution. The brominated polystyrene/1,2-dichloroethane solution was digested with 105 g of a 4.7% aqueous sodium bisulfite solution for 3 hours at 50° C. The product was isolated via the slow continuous addition of the solution to ≧90° C. water in a reactor fitted with mechanical agitator and simple distillation apparatus. This simultaneously flashed the 1,2-dichloroethane overhead as the water azeotrope and precipitated the product as an aqueous slurry. After filtration and drying, this yielded 54.5 g of brominated polystyrene containing 66.5% organic bromine with an MPS molecular weight of 9900.

EXAMPLE III

Bromination of Polystyrene (MW 9000) Using a Tetrahydrofuran Workup to Remove Occluded Bromine and Methanol Non-solvent Precipitation Brominated polystyrene was prepared according to Example I except 3.5 mole percent antimony metal was used as the catalyst and the ratio of polystyrene to bromine was 1:12.5. After the one hour post-chlorine addition hold period was completed, the bromination reaction mixture was quenched with water. The product was isolated as an aqueous slurry as in Example I. After filtration, a portion of the wet filter cake (33.8 g) was dissolved in tetrahydrofuran. The brominated polystyrene was reprecipitated into excess methanol. This yielded 19.9 g of dry product containing 65.7% organic bromine and having a molecular weight of 10,600.

EXAMPLE IV

Bromination of Polystyrene (MW 9000) Using Antimony Trichloride with Chlorine Added After Polystyrene Addition To a 500 ml round-bottom flask was charged 200 ml (624.0 g, 3.90 moles) of liquid bromine and 4.38 g (0.019 mole) of antimony trichloride. The temperature of the bromination mixture was adjusted to 25° C. and 33.4 g (0.32 mole) of polystyrene was added over one hour, while maintaining the reaction temperature at 25°±2° C. After all the polystyrene had been added to the pot, chlorine, 57.8 g (0.82 mole), was added sub-surface over one hour while maintaining the reaction temperature at 25°±2° C. After completion of the chlorine addition, the bromination mixture was held at 25°±2° C. for 2 hours, after which time the reaction was complete as evidenced by the lack of hydrogen chloride off-gas. The bromination mixture was quenched with 50 ml of water. The bromine was stripped from the product and the product isolated as an aqueous slurry as per Example I, affording 156.4 g of wet cake after filtration. The wet product was dissolved in 750 ml of tetrahydrofuran. The product was precipitated by adding tetrahydrofuran solution to 1000 ml of methanol. The dried brominated polystyrene weighed 119.7 g and had an organic bromine content of 71.8% and an MPS molecular weight of 4400.

EXAMPLE V

Bromination of Polystyrene Using 1 Mole-Percent Antimony Trichloride

Brominated polystyrene was prepared in a fashion similar to Example IV, using 1 mole-percent antimony trichloride as catalyst. This yielded dried product with an organic bromine content of 69.1% and an MPS molecular weight of 7800.

EXAMPLE VI

Bromination of High Molecular Weight Polystyrene (MPS MW 203,000)

In a fashion similar to Example IV, high molecular weight polystyrene was brominated, using 4 mole-percent antimony trichloride as catalyst and 1.01 moles of chlorine per mole of polystyrene. In addition, the product was precipitated and the solvent flashed using hot (90°–100° C.) water. This yielded a product with an organic bromine content of 66.5% and an MPS molecular weight of 117000.

EXAMPLE VII

Bromination of Low Molecular Weight Polystyrene (MPS MW 400)

Low molecular weight polystyrene was brominated in a fashion similar to Example IV. The temperature of the solution was maintained at 15°±2° C. while 60.0 g (0.576 moles) of polystyrene and 28.25 g (0.398 moles) of chlorine was added over a period of one hour. The subsurface addition of an additional 28.25 g of chlorine continued thereafter for one hour. The product was precipitated and the solvent flashed using hot (90°–100° C.) water. This yielded a product with an organic bromine content of 65.9%.

EXAMPLE VIII

Preparation of Various Brominated Aromatic Polymers by the General Bromination-in-Bromine Procedure with and without Chlorine In a fashion similar to Example VI, a number of alternate copolymers and homopolymers have been brominated by this method. The results for polystyrene are listed in Table I and for various co-polymers in Table II. In Table I the mole ratio of chlorine used was varied to demonstrate the production of brominated polystyrene of various bromine contents. Although not the most preferred technique, that data demonstrates an alternate method for controlling the bromination level of the polymer.

TABLE I

| Polymer | Moles Chlorine Added/Mole Aromatic Unit | Organic Bromine % | Bromines/ Aromatic Unit |
| --- | --- | --- | --- |
| Polystyrene | 0 | 49.2 | 1.3 |
| Polystyrene | 0.52 | 55.7 | 1.7 |
| Polystyrene | 1.01 | 66.5 | 2.5 |
| Polystyrene | 1.61 | 72.2 | 3.3 |

TABLE II

| Polymer | Moles Chlorine Added/Mole Aromatic Unit | Organic Bromine % | Bromines/ Aromatic Unit |
| --- | --- | --- | --- |
| Poly-(p-methylstyrene) | 1.03 | 69.0 | 3.4 |
| Poly-(α-methylstyrene) | 1.02 | 63.3 | 2.7 |
| Poly-(styrene/maleic anhydride) | 1.03 | 47.1 | 1.9 |
| Poly-(styrene/acrylonitrile) | 1.12 | 48.2 | 1.7 |

EXAMPLE IX

Bromination of Polystyrene in Bromine Using Alternative Catalysts

To a 0.5 L four-necked flask equipped with a condenser, stirrer, and a means for subsurface chlorine gas addition was charged 624 g (3.9 moles) of liquid bromine and a metal halide catalyst in the amount shown in Table III. The temperature of the bromine was adjusted to 15° C. and ground polystyrene (13-16 mesh) was added continuously over one hour, after which 32.5 g (0.31 mole) had been added. Throughout the polystyrene addition, cooling was used as required to maintain 15°±1° C. In each case, concurrently with the polystyrene addition and continuing for one hour thereafter, 31 g (0.4 moles) chlorine was added continuously subsurface to the reaction mass. The reaction mass was held at 15° C. for 15 minutes post chlorine addition, after which the product was isolated as an aqueous slurry by flash distillation of the bromine via the slow continuous addition to hot, 90° C. water. After filtration, the products were dried in a forced draft oven at 115° C. Data for the products of these runs are given in Table III.

TABLE III

| Catalyst | Mole Percent | Organic Bromine, % | Organic Chlorine, % |
| --- | --- | --- | --- |
| Aluminum Chloride | 3.36 1/ | 72.6 | ≦1.0 |
| Aluminum Chloride | 3.29 | 71.7 | ≦1.0 |
| Ferric Chloride | 3.27 | 72.0 | ≦1.0 |
| Antimony Trichloride | 3.00 | 67.3 | ≦1.0 |
| Stannic Chloride | 3.39 | 48.6 | 3.8 |
| Titanium Tetrachloride | 2.95 | 47.0 | 4.1 |
| Zinc Bromide | 3.27 | 45.5 | 4.9 |
| None | 0 | 46.4 | 7.8 |

EXAMPLE X

Controlled Bromination of Polystyrene in Bromine

To a one-liter, four-necked flask equipped with a condenser, stirrer, and a means for subsurface chlorine gas addition was charged 2060 g (12.9 moles) of liquid bromine and 13.6 g (0.0596 moles) of antimony trichloride. The temperature of the bromine was adjusted to 15° C. and polystyrene was added continuously over 1 hour 50 minutes, after which 200.0 g (1.923 moles) had been added. During the same period, 105.6 g (1.49 moles) of chlorine gas was added continuously subsurface to the reaction mass. The addition of chlorine was continued at a constant rate for another three hours, until a total of 236.3 g (3.33 moles) of chlorine had been added. Throughout the polystyrene/chlorine addition, cooling was used as required to maintain a temperature of 15°±1° C.

At four points during the reaction, a 15 to 20 g sample of the reaction mixture was taken and replaced by an equal volume of bromine using a pump and small-bore tubing. The samples corresponded to the following amounts of chlorine being added to the reactor:

| Sample No. | Weight of Chlorine Added | Moles Chlorine | Mol BrCl per Mol polystyrene |
| --- | --- | --- | --- |
| 1 | 105.6 g | 1.49 | 1.53 |
| 2 | 145.2 g | 2.05 | 2.05 |
| 3 | 188.7 g | 2.66 | 2.62 |
| 4 | 236.3 g | 3.33 | 3.09 |

Within five minutes of the sampling time, each sample was neutralized in 150 ml of an aqueous solution of 9.8 wt % NaOH and 11.5 wt % NaHSO$_3$. After agitating the solution for several minutes, the brominated polystyrene precipitate was transferred to a mortar and pestle and triturated with about 30 ml of the sulfite solution to ensure neutralization of the bromine. The solids were then isolated by filtration, washed three times with 250 ml of water and dried at 120° C. Data for the products of these runs are given Table IV.

TABLE IV

| Sample No. | Organic Br. Weight % | Mol Br Per Ring | Mol BrCl per Mol Polystyrene At Sampling Time |
| --- | --- | --- | --- |
| 1 | 58.68 | 1.53 | 1.55 |
| 2 | 61.72 | 2.05 | 2.13 |
| 3 | 67.36 | 2.62 | 2.77 |
| 4 | 70.84 | 3.09 | 3.47 |

The data above demonstrates that bromination is a linear function of the equivalents of BrCl added up to the sampling time. Thus, the bromination level of brominated polystyrene can be controlled over a broad range of values by controlling the amount of chlorine added to the reaction.

EXAMPLE XI

Fine Control of Polystyrene Bromination in Bromine

To a 0.5 L, four-necked flask equipped with a condenser, stirrer and a means for subsurface chlorine gas addition was charged 624 g (3.9 moles) of liquid bromine and 2.05 g (0.0168 moles) antimony. The temperature of the bromine was adjusted to 15°±2° C. and polystyrene was added continuously over one hour, after which 50.0 g (0.48 mole) had been added. At the same time one-half of the total desired chlorine charge was added subsurface. The remainder of the chlorine addition was completed the following hour. Throughout the polystyrene/chlorine addition, the solution was maintained at 15°±2° C. The brominated polystyrene was isolated as per Example III. Data for the products of these runs are given in Table V.

TABLE V

| Sample No. | Total chlorine charge g. | Total chlorine charge Moles | Moles BrCl/Mole Polystyrene | Organic Br. Wt % | Mol Br Per Aromatic Unit |
|---|---|---|---|---|---|
| 1 | 42.7 | 0.602 | 2.50 | 64.0 | 2.26 |
| 2 | 44.5 | 0.628 | 2.62 | 64.5 | 2.31 |
| 3 | 48.6 | 0.685 | 2.84 | 65.7 | 2.44 |
| 4 | 50.2 | 0.708 | 2.94 | 67.5 | 2.64 |

As in Example X, the data above demonstrates that the level of bromination is a linear function of the amount of chlorine added and, accordingly, that bromination can be controlled by the chlorine charge.

I claim:

1. A process for producing brominated styrenic polymers containing about 10% to 75% by weight bromine comprising the steps of:
    reacting a styrene homo- or co-polymer having an MPS molecular weight of from about 300 to about 1,500,000 under substantially anhydrous conditions with bromine chloride in the presence of from about 5 up to about 100 parts of liquid bromine per part of styrenic polymer as the sole reaction medium and a Lewis acid halide catalyst at a temperature of from about −20° C. up to about 60° C., the bromine chloride having been formed in situ by the addition of chlorine to the liquid bromine reaction solvent and in which the degree of bromination of the styrenic polymer is controlled by adjusting the molar ratio of chlorine to styrenic polymer; and
    thereafter recovering the brominated styrenic polymer thereby produced.

2. A process, as claimed in claim 1, in which the styrenic homo- or co-polymer is a member selected from the group consisting of polystyrene, poly-(p-methylstyrene), poly-(α-methylstyrene), styrene maleic anhydride copolymer, styrene acrylonitrile copolymer and mixtures thereof.

3. A process, as claimed in claim 1, in which the catalyst is selected from the group consisting of antimony, antimony halides, antimony compounds which form antimony bromides under the conditions of the reaction, iron, iron halides, iron compounds which form iron bromides under the conditions of the reaction, aluminum, aluminum halides, aluminum compounds which form aluminum bromides under the conditions of the reaction, titanium, titanium halides, titanium compounds which form titanium bromides under the conditions of the reaction, tin, stannic halides, stannic compounds which form stannic bromides under the conditions of the reaction, zinc, zinc halides and zinc compounds which form zinc bromides under the conditions of the reaction.

4. A process, as claimed in claim 1, in which the catalyst is provided in an amount equal to from about 0.1 up to about 10 mole percent based upon the contained aromatics of the styrenic homo- or co-polymer.

5. A process, as claimed in claim 1, in which the brominated styrenic polymer is recovered from the reaction mixture by:
    precipitating the brominated styrenic polymer from the reaction mixture by contacting the reaction mixture with a non-solvent inert to bromine; and
    filtering the precipitated brominated styrenic polymer.

6. A process, as claimed in claim 5, in which the non-solvent is water.

* * * * *

UNITED STATES PATENT AND TRADEMARK OFFICE
CERTIFICATE OF CORRECTION

PATENT NO. : 4,879,353

DATED : November 7, 1989

INVENTOR(S) : David C. Sanders; John L. Sands; Robert J. Stahl

It is certified that error appears in the above-identified patent and that said Letters Patent is hereby corrected as shown below:

On the title page:

Inventor No. 3 should be -- Robert J. Stahl --; and

Table III, line 17, add the footnote -- $\underline{1/}$ 34.8g (0.5 mole) chlorine charged to the reaction mass. --

Signed and Sealed this

Thirteenth Day of August, 1991

Attest:

HARRY F. MANBECK, JR.

*Attesting Officer*     *Commissioner of Patents and Trademarks*